(12) United States Patent
Liu et al.

(10) Patent No.: US 9,553,968 B2
(45) Date of Patent: Jan. 24, 2017

(54) METHOD AND DEVICE FOR RECORDING INFORMATION

(71) Applicant: Xiaomi Inc., Beijing (CN)

(72) Inventors: Xiaohua Liu, Beijing (CN); Zhen Chen, Beijing (CN); Dongliang Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/100,512

(22) Filed: Dec. 9, 2013

(65) Prior Publication Data

US 2014/0147092 A1 May 29, 2014

Related U.S. Application Data

(63) Continuation of application No. PCT/CN2013/078863, filed on Jul. 5, 2013.

(30) Foreign Application Priority Data

Nov. 23, 2012 (CN) .......................... 2012 1 0484408

(51) Int. Cl.
| | |
|---|---|
| H04N 9/80 | (2006.01) |
| H04M 1/656 | (2006.01) |
| H04N 5/77 | (2006.01) |
| H04N 9/82 | (2006.01) |

(52) U.S. Cl.
CPC ............. *H04M 1/656* (2013.01); *H04N 5/772* (2013.01); *H04N 9/8211* (2013.01); *H04M 2250/12* (2013.01)

(58) Field of Classification Search
CPC ................................ G11B 27/34; H04M 1/656

USPC .. 348/61, 207.1; 386/200, 242, 224; 379/68, 79
See application file for complete search history.

(56) References Cited

U.S. PATENT DOCUMENTS

| | | | |
|---|---|---|---|
| 2008/0055415 A1* | 3/2008 | Fujiyama et al. | ......... 348/207.1 |
| 2009/0287449 A1 | 11/2009 | Nagashima | |
| 2011/0199470 A1* | 8/2011 | Moller et al. | ................... 348/61 |

FOREIGN PATENT DOCUMENTS

| | | | |
|---|---|---|---|
| CN | 201601840 U | | 10/2010 |
| CN | 102158643 | | 8/2011 |
| CN | 102340595 A | | 2/2012 |
| CN | 102523339 A | | 6/2012 |
| CN | 102609091 A | | 7/2012 |
| CN | 102938808 A | | 2/2013 |
| JP | 08163276 A | | 6/1996 |
| JP | 2005-109858 | * | 4/2005 |

(Continued)

OTHER PUBLICATIONS

European Search Report for Application No. 13857480.1, from the European Patent Office, dated Sep. 4, 2015.

(Continued)

*Primary Examiner* — Thai Tran
*Assistant Examiner* — Mishawn Hunter
(74) *Attorney, Agent, or Firm* — Finnegan, Henderson, Farabow, Garrett & Dunner LLP

(57) ABSTRACT

A method for a mobile terminal to record information, including: detecting an acceleration of the mobile terminal; determining whether the detected acceleration is higher than or equal to a preset acceleration threshold; and initiating a recording function of the mobile terminal to record information if it is determined that the detected acceleration is higher than or equal to the preset acceleration threshold.

16 Claims, 7 Drawing Sheets

(56) References Cited

FOREIGN PATENT DOCUMENTS

| | | | |
|---|---|---|---|
| JP | 2006-191436 | * 7/2006 | ............ H04M 11/10 |
| JP | 2007135008 A | 5/2007 | |
| JP | 2008-060776 A | 3/2008 | |
| JP | 2008193250 A | 8/2008 | |
| JP | 2008-258844 A | 10/2008 | |
| JP | 2009-004996 A | 8/2009 | |
| JP | 2012508530 A | 4/2012 | |
| JP | 2012146298 A | 8/2012 | |
| KR | 20 2009 0004399 A | 5/2009 | |
| KR | 10 2009 0082164 | 7/2011 | |
| KR | 10-2011-0100620 | 9/2011 | |
| RU | 2251221 C2 | 4/2005 | |
| WO | WO 2006/075419 A1 | 7/2006 | |
| WO | WO 2011/098899 A1 | 8/2011 | |

OTHER PUBLICATIONS

International Search Report for PCT International Application No. PCT/CN2013/078863, from the State Intellectual Property Office of the P.R. China, dated Oct. 3, 2013, and English translation thereof.
Notification on Results of Examining Patentability of Invention Office Action mailed on May 12, 2016, in counterpart Russian Application No. 2014152264/08(083607) and English translation thereof.

* cited by examiner

METHOD AND DEVICE FOR RECORDING INFORMATION

RELATED APPLICATIONS

This application is a continuation of International Application No. PCT/CN2013/078863, filed Jul. 5, 2013, which is based upon and claims priority from Chinese Patent Application No. CN201210484408.1, filed Nov. 23, 2012, the entire contents of which are incorporated herein by reference.

TECHNICAL FIELD

The present disclosure relates generally to the technical field of mobile terminals, and particularly to a method and a device for recording information.

BACKGROUND

In the mobile internet era, mobile terminals, such as mobile phones, not only act as communication tools, but also play the role of portable computers due to development of intelligent technologies. People can surf the internet, watch movies, watch TV programs, etc., anytime anywhere by using mobile terminals. In addition, people can record information, for example, record text messages in a memorandum, or record audio or video files for using later.

Conventionally, if a user needs to record communications during a call, the user needs to switch a mobile terminal to its desktop, find recording software, and then initiate the software to record. This process may not only affect the normal communications, but also delay start of recording. Thus, the recording may not start in time, and important contents of the communications which need to be recorded may be missed.

Conventionally, a recording function button may be provided on a housing of the mobile terminal for the user to initiate the call recording function of the mobile terminal. However, for a mobile terminal having a touch screen, a number of buttons on the housing of the mobile terminals is generally limited.

SUMMARY

According to a first aspect of the present disclosure, there is provided a method for a mobile terminal to record information, comprising: detecting an acceleration of the mobile terminal; determining whether the detected acceleration is higher than or equal to a preset acceleration threshold; and initiating a recording function of the mobile terminal to record information if it is determined that the detected acceleration is higher than or equal to the preset acceleration threshold.

According to a second aspect of the present disclosure, there is provided a mobile terminal for recording information, comprising: a processor; and a memory for storing instructions executable by the processor, wherein the processor is configured to: determine whether an acceleration of the mobile terminal is higher than or equal to a preset acceleration threshold; and initiate a recording function of the mobile terminal to record the information if it is determined that the acceleration is higher than or equal to the preset acceleration threshold.

According to a third aspect of the present disclosure, there is provided a non-transitory computer-readable medium having stored therein instructions that, when executed by a processor of a mobile terminal, cause the mobile terminal to perform: detecting an acceleration of the mobile terminal; determining whether the detected acceleration is higher than or equal to a preset acceleration threshold; and initiating a recording function of the mobile terminal to record information if it is determined that the detected acceleration is higher than or equal to the preset acceleration threshold.

It is to be understood that both the foregoing general description and the following detailed description are exemplary and explanatory only and are not restrictive of the invention, as claimed.

BRIEF DESCRIPTION OF THE DRAWING

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
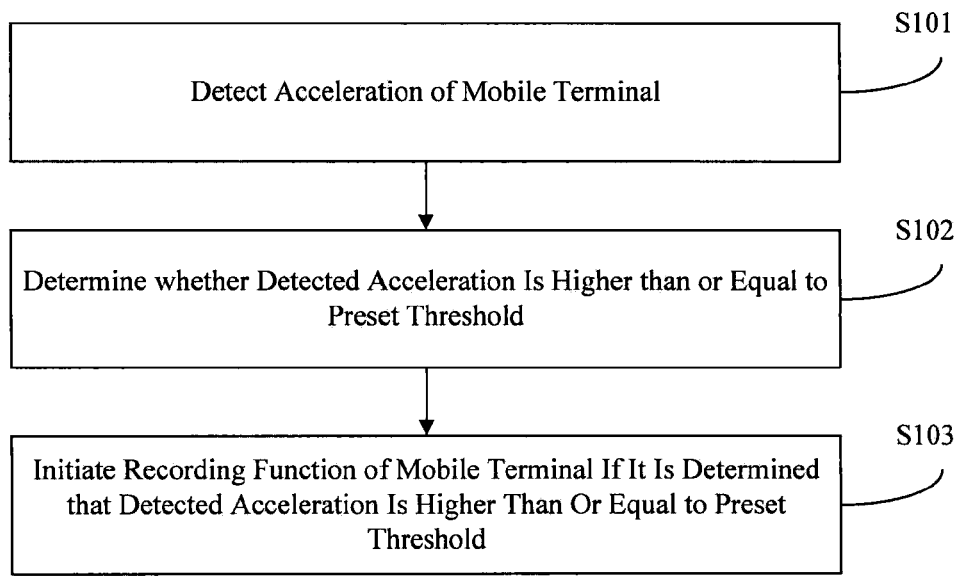
FIG. 1 is a flowchart of a method for recording information in a device, according to an exemplary embodiment.

FIG. 1 is a flowchart of a method 100 for recording information in a device, such as a mobile terminal, according to an exemplary embodiment. Referring to FIG. 1, the method 100 includes the following steps.

In step S101, an acceleration of the mobile terminal is detected, such that the mobile terminal can initiate a recording function according to the detected acceleration of the mobile terminal. For example, if it is determined that the detected acceleration of the mobile terminal satisfies a predetermined condition, the mobile terminal automatically initiates the recording function without a manual operation by a user. In one exemplary embodiment, if the user needs to record communications during a call, the user may shake the mobile terminal for the mobile terminal to have a high acceleration. If the mobile terminal detects that its acceleration is sufficiently high, e.g., satisfying the predetermined condition, the mobile terminal initiates the recording function by running a software application in the background to record the communications. In one exemplary embodiment, an acceleration sensing device is used to detect the acceleration of the mobile terminal. The acceleration sensing device may be a device including one or more acceleration sensors which are capable of measuring an accelerating force, i.e., a force acting on an object during its acceleration process. The acceleration sensors may be located inside or outside the mobile terminal. When the mobile terminal is stationary or moves at a constant speed along with the user, the acceleration detected by the acceleration sensor device is approximately zero. If the mobile terminal changes from a stationary state to a motion state or from a motion state to a stationary state, or alters its movement velocity during movement, the acceleration detected by the acceleration sensor device is higher than zero. Therefore, when the user shakes the mobile terminal or when the mobile terminal falls from a height, the acceleration sensor device is relatively high.

Still referring to FIG. 1, in step S102, the mobile terminal determines whether the detected acceleration is higher than or equal to a preset threshold. In exemplary embodiments, after detecting the acceleration of the mobile terminal, the mobile terminal compares the detected acceleration of the mobile terminal with the preset threshold. If the detected acceleration is higher than or equal to the preset threshold, the acceleration of the mobile terminal is determined to be high; otherwise, if the detected acceleration is lower than the preset threshold, the acceleration of the mobile terminal is determined to be low. The threshold may be set according to actual requirements. If the threshold is set to be high, a sensitivity of the mobile terminal is low, i.e., a slight acceleration or deceleration motion will not trigger an initiation of the recording function. Conversely, if the threshold is set to be low, the sensitivity is high. In the illustrated embodiments, if it is desired that the recording function can be initiated only when it is determined that the detected acceleration is caused by a voluntary action of the user, a proper threshold may be set for determining whether an increase of the acceleration is caused by a voluntary action of the user. For example, the acceleration along a direction, e.g., any axis of x, y, or z, being higher than 14 m/s$^2$ can be generally determined as a shaking operation performed by the user.

Still referring to FIG. 1, in step S103, the mobile terminal initiates the recording function of the mobile terminal to record information if it is determined that the detected acceleration is higher than or equal to the preset threshold. In exemplary embodiments, if it is determined that the detected acceleration of the mobile terminal is higher than or equal to the preset threshold, which indicates that the user is shaking the mobile terminal, or that the mobile terminal falls down from a height, e.g., during an accident, the mobile terminal automatically initiates the recording function.

In the illustrated embodiments, the recording function of the mobile terminal is automatically initiated when it is determined that the detected acceleration of the mobile terminal is higher than or equal to the preset threshold. Therefore, the recording function can be initiated quickly without a special button being added on a limited area of a housing of the mobile terminal, which is advantageous when the mobile terminal has a touch screen. In addition, if the user wants to initiate the recording function, the user can shake the mobile terminal, and the recording function is automatically initiated without the need for the user to locate relevant software from user interface and initiate it. As a result, a quick recording operation is realized.

In actual applications, software applications for the recording function and recorded contents may be different, depending on different situations of the mobile terminal when having a high acceleration. In exemplary embodiments, in addition to detecting the acceleration of the mobile terminal, whether the mobile terminal is in a call state is also determined. According to the detected acceleration of the mobile terminal and a determination result of the call state, the mobile terminal determines which recording function(s) should be initiated and what information should be recorded, as described below.

In exemplary embodiments, if it is determined that the detected acceleration is high and the mobile terminal is determined to be in a call state, which indicates that the user needs to record communications during the call, the recording software is initiated and the speech of both sides of the call is recorded, i.e., the local speech of the user received by an audio input device, such as a microphone, of the mobile terminal and the remote speech of the other side of the call are recorded. After the call ends, recorded contents are saved, for example, as local files. Additionally, the files may be sent to a predefined location, for example, a designated mailbox as enclosures, or may be sent to other designated mobile terminals, etc. Before the files are sent to a predefined location, the mobile terminal may inquire of the user whether to send the files. If the user selects to send the files, the mobile terminal sends the files.

In exemplary embodiments, if it is determined that the detected acceleration is high and the mobile terminal is determined not to be in a call state, which indicates that the user might have encountered an accident, such as falling down from a height or dropping the mobile terminal from a height, the audio input device of the mobile terminal is automatically initiated, and the audio recording function of the mobile terminal is initiated to record audio information received by the audio input device. Additionally and/or alternatively, a camera device of the mobile terminal may also be initiated, and the video recording function of the mobile terminal may be initiated to record video information received by the camera device. As a result, the audio information and the video information on the scene are recorded. In one exemplary embodiment, after the initiation of the camera device, the mobile terminal also determines whether the camera keeps in dark during a period of time. If yes, which indicates that the camera device may be shaded and thus cannot capture valid images, it is unnecessary to record video information to avoid an unwanted waste of power of the mobile terminal. In addition, an ending point of the recording may be provided according to actual requirements, and recorded contents are saved as files. For example, a time period, e.g., 5 minutes, may be preset, and when the preset time period passes from the start of recording, the recording stops automatically, and the recorded contents are saved as one or more files. Additionally and/or alternatively, the time at which the recording is stopped may be determined based on a remaining power of the mobile terminal. For example, the recording may stop when the remaining power of the mobile terminal is lower than 20%, and the recorded contents are saved as one or more files.

In the above illustrated embodiments, the user may experience an accident. Therefore, to notify other people, the mobile terminal may also send the files for the recorded contents to a designated location after the end of the recording. For example, the files may be sent to a designated mailbox as enclosures, or may be sent to other designated mobile terminals. Before the files are sent, the mobile terminal may inquire of the user whether to send the files. If the user selects to send the files, the mobile terminal sends the files. In addition, if a selection is not received from the user within a preset time period, such as 10 seconds, which indicates that the user may have no time to attend to this matter, or the user may be injured and thus cannot perform a selection operation, the mobile terminal may automatically send the files to the designated location.

In one exemplary embodiment, to send the recorded contents in time, or avoid the situation of being unable to send due to the power being exhausted or too low, the mobile terminal saves the recorded contents and sends to a designated location every preset time period, such as every 1 minute, from the start of the recording.

In exemplary embodiments, whether the mobile terminal is in a call state may be determined according to a message broadcasted by an operating system of the mobile terminal. Generally, the operating system of the mobile terminal provides interfaces for software applications, such that the software applications may obtain required messages from the operating system through the interfaces. In the illustrated embodiments, to detect whether the mobile terminal is in a call state, the software applications are registered in the operating system. When the operating system broadcasts a notification message, the software applications receive the notification massage and obtain information therefrom. For instance, when the user receives a call, the operating system of the mobile terminal may broadcast a call message, and the software applications may monitor the event of receiving a call to determine the call state. Alternatively, when the user makes a call, the operating system may broadcast a message for making a call after the user presses down, e.g., a "calling" button, and the software applications may monitor the event of making a call to determine the call state. When the user hangs up a call, the operating system may also broadcast a call end message. Therefore, whether the mobile terminal is in a call state can be determined according to the messages broadcasted by the operating system.

Figure 2:
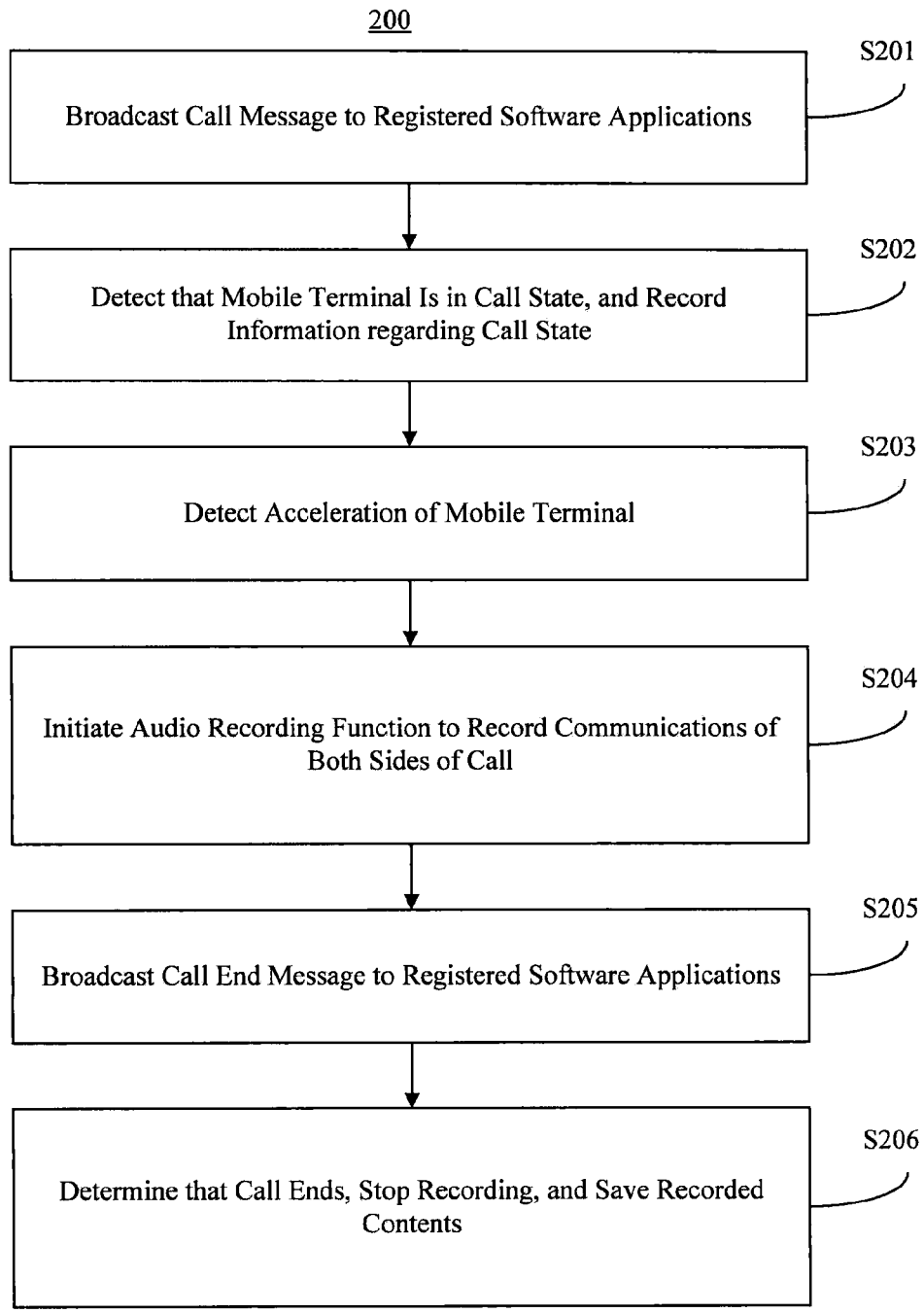
FIG. 2 is a flowchart of a method for recording information in a device, according to an exemplary embodiment.

FIG. 2 is a flowchart of a method 200 for recording information in the mobile terminal, according to an exemplary embodiment. In the illustrated embodiment, it is assumed that the user receives a call. Referring to FIG. 2, the method 200 includes the following steps.

In step S201, the operating system of the mobile terminal broadcasts a call message to registered software applications.

In step S202, it is detected that the mobile terminal is in a call state based on the broadcasted call message, and information regarding the call state is recorded.

In step S203, the acceleration sensor device of the mobile terminal detects an acceleration of the mobile terminal, as a result of the user shaking the mobile terminal when the user determines to record communications during the call.

In step S204, the mobile terminal initiates an audio recording function to record the communications of both sides of the call when the mobile terminal determines that the detected acceleration is higher than or equal to a preset threshold and that the mobile terminal is currently in a call state based on the information recorded in step S202.

In step S205, the operating system of the mobile terminal broadcasts a call end message to the registered software applications after the end of the call.

In step S206, the mobile terminal determines that the call ends based on the call end message broadcasted by the operating system, and thus stops the recording and saves recorded contents as a file.

In this manner, the method 200 can quickly initiate the audio recording function to record the communications during the call.

Figure 3:
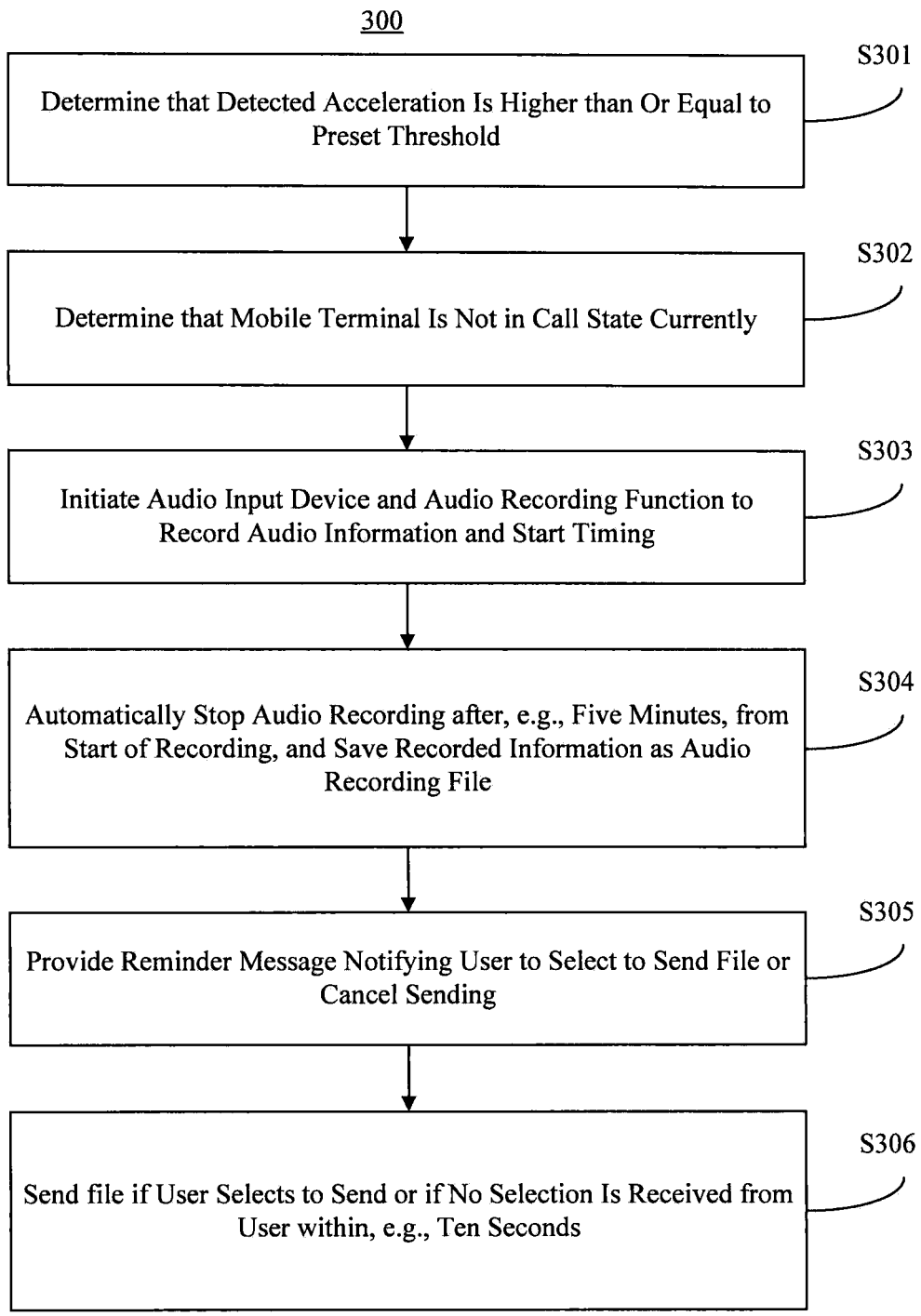
FIG. 3 is a flowchart of a method for recording information in a device, according to an exemplary embodiment.

FIG. 3 is a flowchart of a method 300 for recording information in the mobile terminal, according to an exemplary embodiment. In the illustrated embodiment, it is assumed that the user falls down from a bus when getting on or off the bus. Referring to FIG. 3, the method 300 includes the following steps.

In step S301, the acceleration sensor device of the mobile terminal detects an acceleration of the mobile terminal when the user is falling down, and the mobile terminal determines that the detected acceleration is higher than or equal to a preset threshold.

In step S302, the mobile terminal determines that it is not in a call state currently, since no call broadcast message is received from the operating system after the end of the last call.

In step S303, the mobile terminal initiates an audio input device, e.g., a microphone, and an audio recording function to record audio information received by the microphone and starts timing.

In step S304, the mobile terminal automatically stops the audio recording after, e.g., five minutes, from the start of the recording, and saves the recorded information as an audio recording file.

In step S305, the mobile terminal provides a reminder message notifying the user to select to send the file or cancel sending.

In step S306, the mobile terminal sends the file to other predetermined mobile terminals, such as the mobile terminals of family members of the user, if the user selects to send the file or if no selection is received from the user within, e.g., ten seconds. Alternatively, the mobile terminal may automatically send the file.

In this manner, the method 300 can automatically record the scene and send to other designated mobile terminals.

Figure 4:
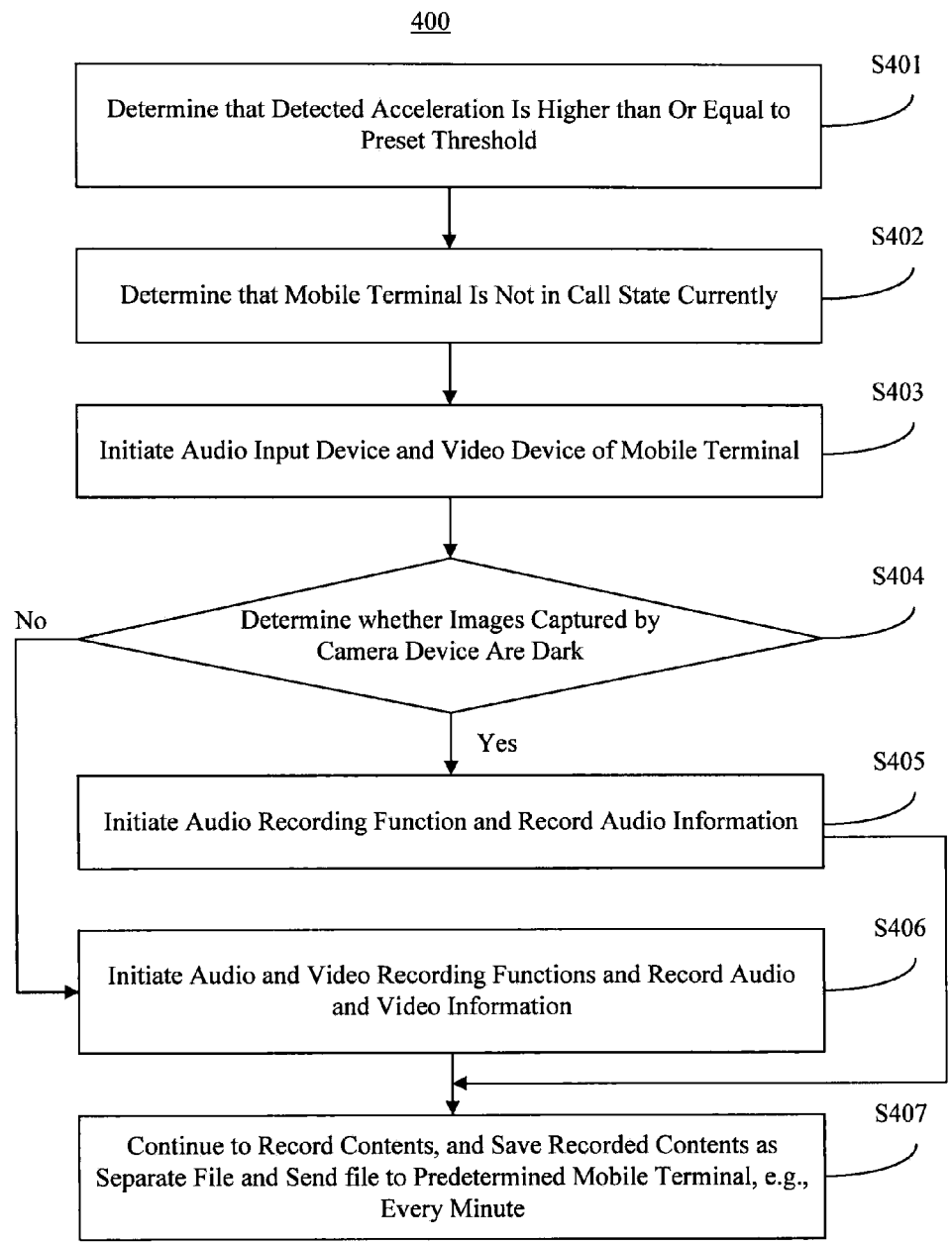
FIG. 4 is a flowchart of a method for recording information in a device, according to an exemplary embodiment.

FIG. 4 is a flowchart of a method 400 for recording information in the mobile terminal, according to an exemplary embodiment. In the illustrated embodiment, it is assumed that the user encounters a traffic accident. Referring to FIG. 4, the method 400 includes the following steps.

In step S401, the acceleration sensor device of the mobile terminal detects an acceleration of the mobile terminal when the traffic accident occurs, and the mobile terminal determines that the detected acceleration is higher than or equal to a preset threshold.

In step S402, the mobile terminal determines that it is not in a call state currently, since no call broadcast message is received from the operating system after the end of the last call.

In step S403, the mobile terminal initiates an audio input device, e.g., a microphone, and a camera device of the mobile terminal.

In step S404, the mobile terminal determines whether images captured by the camera device are dark, and if yes, step S405 is performed; and if no, step S406 is performed.

In step S405, the mobile terminal initiates an audio recording function and records the audio information received by the microphone.

In step S406, the mobile terminal initiates the audio and video recording functions to record the audio information received by the microphone and the images captured by the camera.

In step S407, the mobile terminal continues to record contents, and saves the recorded contents as a separate file and sends the file to a predetermined mobile terminal, e.g., every minute.

In this manner, the method 400 automatically records the accident scene in a plurality of files for sending to a designated location without manual operation. As a result, the situation of the mobile terminal being unable to send the files due to exhaustion of power can be avoided.

Figure 5:
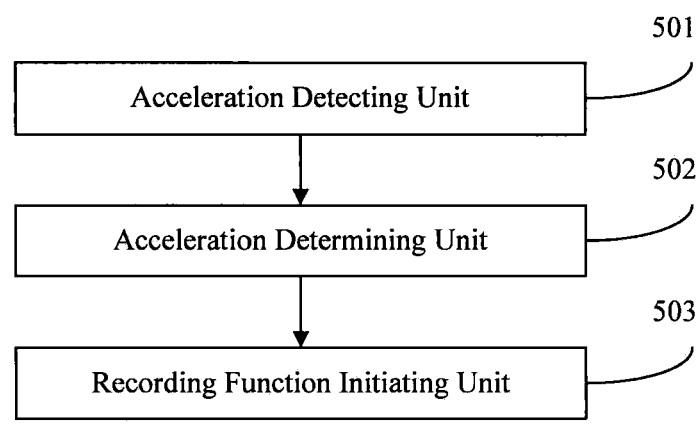
FIG. 5 illustrates a block diagram of a mobile terminal for recording information, according to an exemplary embodiment.

FIG. 5 illustrates a block diagram of a mobile terminal 500 for recording information, according to an exemplary embodiment. Referring to FIG. 5, the mobile terminal 500 includes an acceleration detecting unit 501, an acceleration determining unit 502, and a recording function initiating unit 503.

In exemplary embodiments, the acceleration detecting unit 501 is configured to detect an acceleration of the mobile terminal. The acceleration determining unit 502 is configured to determine whether the detected acceleration is higher than or equal to a preset threshold. The recording function initiating unit 503 is configured to initiate a recording function of the mobile terminal to record information if the acceleration determining unit determines that the detected acceleration is higher than or equal to the preset threshold.

Figure 6:
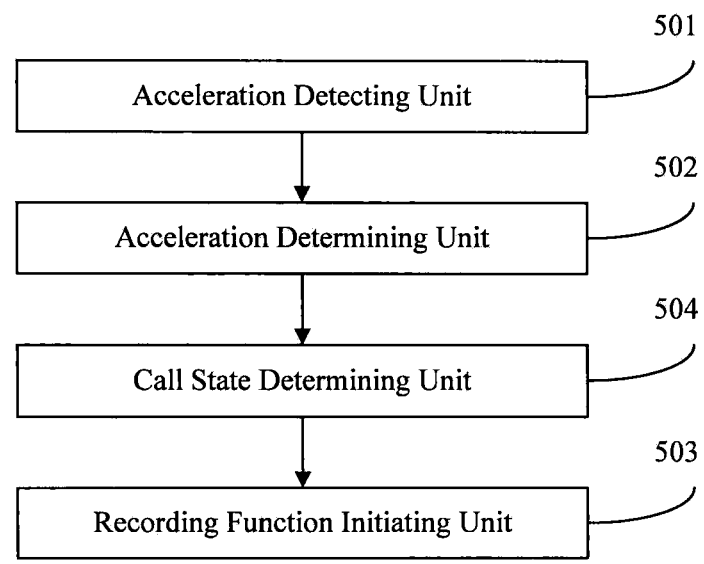
FIG. 6 illustrates a block diagram of a mobile terminal for recording information, according to an exemplary embodiment.

FIG. 6 illustrates a block diagram of a mobile terminal 600 for recording information, according to an exemplary embodiment. Referring to FIG. 6, the mobile terminal 600 includes a call state determining unit 504, in addition to the acceleration detecting unit 501, the acceleration determining unit 502, and the recording function initiating unit 503.

Referring to FIG. 6, in exemplary embodiments, the call state determining unit 504 is configured to determine whether the mobile terminal 600 is in a call state. Accordingly, the recording function initiating unit 503 includes a first initiating subunit (not shown) configured to initiate an audio recording function of the mobile terminal 600 to record audio information of both sides of a call. In addition, the mobile terminal 600 may further include a first saving unit (not shown) configured to save the recorded audio information after the end of the call.

Alternatively, the recording function initiating unit 503 may include a second initiating subunit (not shown) configured to initiate an audio input device of the mobile terminal 600 and initiate the audio recording function of the mobile terminal 600 to record the audio information received by the audio input device, and to initiate a camera device of the mobile terminal 600 and initiate a video recording function of the mobile terminal 600 to record video information received by the camera device. In addition, the mobile terminal 600 may further include a second saving unit (not shown) configured to stop the recording after a preset time period from the start of the recording, and save the recorded information; or a third saving unit (not shown) configured to stop the recording when a remaining power of the mobile terminal 600 is lower than a preset power threshold, and save the recorded information.

The mobile terminal 600 may further include a sending unit (not shown) configured to send the saved information to a preset location. In one exemplary embodiment, the mobile terminal 600 includes a reminder unit (not shown) configured to provide a reminder message of whether to send the saved information, and trigger an operation of sending the saved information to the preset location if the user selects to send the saved information or no selection is received from the user within a preset time period.

In addition, the mobile terminal 600 may further include a partition saving and sending unit (not shown) configured to save the recorded information and send the saved information to the preset location every preset time period from the start of the recording. The saved information may be sent to a designated mailbox as an enclosure, or sent to another designated mobile terminal.

One skilled in the art would understand that multiple units in the exemplary embodiments may be combined into one unit, and one unit may be divided into multiple units. One of ordinary skill in the art would also understand that multiple subunits in the described embodiments may be combined into one subunit, and one subunit may be divided into multiple subunits.

Figure 7:
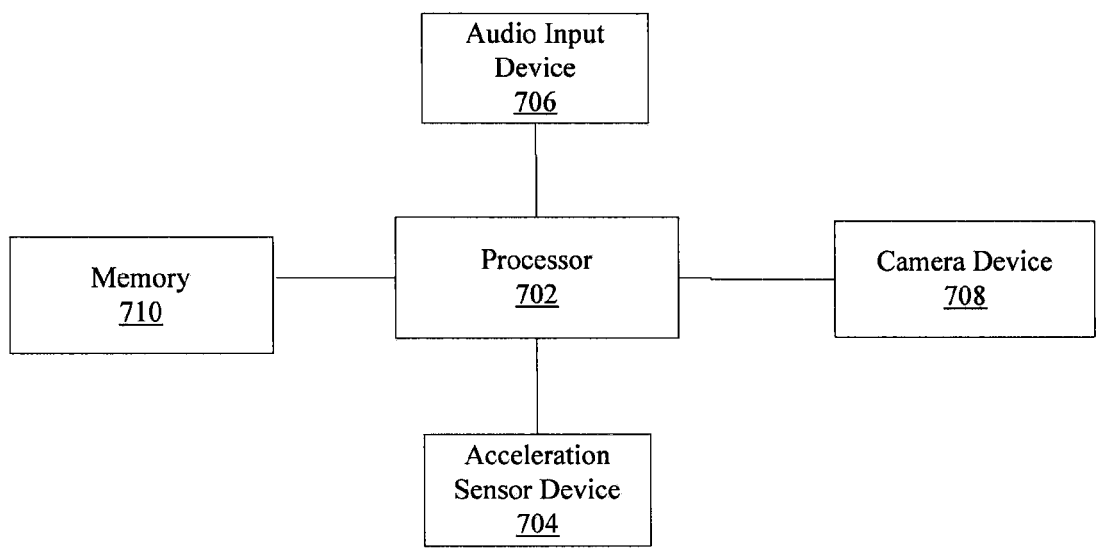
FIG. 7 illustrates a block diagram of a mobile terminal for recording information, according to an exemplary embodiment.

FIG. 7 illustrates a block diagram of a mobile terminal 700 for recording information, according to an exemplary embodiment. Referring to FIG. 7, the mobile terminal 700 includes a processor 702 configured to execute program instructions to perform the above described methods for recording information, an acceleration sensor device 704 including one or more sensors to detect an acceleration of the mobile terminal 700, an audio input device 706, e.g., a microphone, for receiving audio information, and a camera device 708 for receiving video information. The mobile terminal also includes memory resources, represented by a memory 710, for storing audio information and video information, as well as for storing program instructions and otherwise facilitating operation of the processor 702.

In exemplary embodiments, there is provided a non-volatile storage medium including instructions, such as included in the memory 710, executable by the processor 702 in the mobile terminal 700, for performing the above described methods for recording information.

Each component in the exemplary embodiments may be implemented by hardware, or may be implemented by software running on a processor, or may be implemented by their combination.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a mobile terminal to record information, comprising:
   detecting an acceleration of the mobile terminal;
   determining whether the detected acceleration is higher than or equal to a preset acceleration threshold;
   determining whether the mobile terminal is in a call state;
   initiating a recording function of the mobile terminal to record first information if it is determined that the detected acceleration is higher than or equal to the preset acceleration threshold and the mobile terminal is not in the call state; and
   initiating an audio recording function of the mobile terminal to record audio information of both sides of a call, if it is determined that the detected acceleration is higher than or equal to the preset acceleration threshold and the mobile terminal is in the call state.

2. The method according to claim 1, wherein the initiating of the recording function of the mobile terminal to record the first information comprises:
   initiating an audio input device of the mobile terminal, and initiating an audio recording function of the mobile terminal to record audio information received by the audio input device; and/or
   initiating a camera device of the mobile terminal, and initiating a video recording function of the mobile terminal to record video information received by the camera device.

3. The method according to claim 1, further comprising:
   saving the recorded audio information after the end of the call.

4. The method according to claim 1, further comprising:
   stopping recording the first information after a preset time period from a start of the recording.

5. The method according to claim 1, further comprising:
   stopping recording the first information when a remaining power of the mobile terminal is lower than a preset power threshold.

6. The method according to claim 1, further comprising:
   saving recorded information, the recorded information being one of the recorded first information or the recorded audio information; and
   sending the saved information to a preset location.

7. The method according to claim 6, wherein the sending of the saved information comprises:
   providing a reminder message of whether to send the saved information; and
   if a selection of the user to send the information is received, or if no selection is received from the user within a preset time period, triggering an operation of sending the saved information to the preset location.

8. The method according to claim 6, wherein the saving of the recorded information comprises:
   saving the recorded information every preset time period from the start of the recording.

9. The method according to claim 6, wherein the sending of the saved information comprises:
   sending the saved information to a designated mailbox as an enclosure.

10. The method according to claim 6, wherein the sending of the saved information comprises:
    sending the saved information to another designated mobile terminal.

11. A mobile terminal for recording information, comprising:
    a processor; and
    a memory for storing instructions executable by the processor,
    wherein the processor is configured to:
        determine whether an acceleration of the mobile terminal is higher than or equal to a preset acceleration threshold;
        determine whether the mobile terminal is in a call state;
        initiate a recording function of the mobile terminal to record first information if it is determined that the acceleration is higher than or equal to the preset acceleration threshold and the mobile terminal is not in the call state; and
        initiate an audio recording function of the mobile terminal to record audio information of both sides of a call, if it is determined that the detected acceleration is higher than or equal to the preset acceleration threshold and the mobile terminal is in the call state.

12. The mobile terminal according to claim 11, further comprising:
    an acceleration sensor device configured to detect the acceleration of the mobile terminal.

13. The mobile terminal according to claim 11, further comprising:
    an audio input device configured to receive audio information.

14. The mobile terminal according to claim 11, further comprising:
    a camera device configured to receive video information.

15. The mobile terminal according to claim 11, wherein the processor is further configured to:
    initiate an audio input device of the mobile terminal and initiate an audio recording function of the mobile terminal to record audio information received by the audio input device; and/or
    initiate a camera device of the mobile terminal and initiate a video recording function of the mobile terminal to record video information received by the camera device.

16. A non-transitory computer-readable medium having stored therein instructions that, when executed by a processor of a mobile terminal, cause the mobile terminal to perform:
    detecting an acceleration of the mobile terminal;
    determining whether the detected acceleration is higher than or equal to a preset acceleration threshold;
    determining whether the mobile terminal is in a call state;
    initiating a recording function of the mobile terminal to record first information if it is determined that the detected acceleration is higher than or equal to the preset acceleration threshold and the mobile terminal is not in the call state; and
    initiating an audio recording function of the mobile terminal to record audio information of both sides of a call, if it is determined that the detected acceleration is higher than or equal to the preset acceleration threshold and the mobile terminal is in the call state.

* * * * *